(12) United States Patent
Tanaka et al.

(10) Patent No.: US 6,664,677 B2
(45) Date of Patent: Dec. 16, 2003

(54) VEHICLE-ONBOARD AC GENERATOR (75) Inventors: Kazunori Tanaka, Tokyo (JP); Keiichi Miyamoto, Tokyo (JP); Shigeru Onoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/784,051

(22) Filed: Feb. 16, 2001

(65) Prior Publication Data
US 2002/0033646 A1 Mar. 21, 2002

(30) Foreign Application Priority Data
Sep. 1, 2000 (JP) ........................................ 2000-265353

(51) Int. Cl.[7] ................................................ H02K 9/02
(52) U.S. Cl. ........................ 310/71; 310/68 D; 310/68 R
(58) Field of Search ................................. 310/71, 68 D, 310/68 R; 439/164; 363/142, 146

(56) References Cited

U.S. PATENT DOCUMENTS

| | | | |
|---|---|---|---|
| 3,604,963 A | | 9/1971 | Tawara ......................... 310/71 |
| 4,169,282 A | | 9/1979 | Allport et al. ................. 310/14 |
| 4,419,597 A | | 12/1983 | Shiga et al. ................. 363/145 |
| 4,952,829 A | | 8/1990 | Armbruster et al. ...... 310/68 D |
| 5,229,675 A | * | 7/1993 | Gotoh ......................... 310/71 |
| 5,296,770 A | | 3/1994 | Pflueger et al. ........... 310/68 D |
| 5,451,823 A | * | 9/1995 | Deverall et al. .......... 310/68 D |
| 5,508,571 A | | 4/1996 | Shafer, Jr. ................. 310/68 D |
| 5,682,070 A | * | 10/1997 | Adachi et al. ................ 310/71 |
| 5,949,166 A | * | 9/1999 | Ooiwa et al. ............. 310/68 D |
| 6,198,187 B1 | * | 3/2001 | Asao et al. ............... 310/68 D |
| 6,198,188 B1 | * | 3/2001 | Ihata ......................... 310/68 D |
| 6,275,404 B1 | * | 8/2001 | Shichijyo et al. ........... 363/145 |

FOREIGN PATENT DOCUMENTS

| | | | |
|---|---|---|---|
| EP | 0 720 273 A2 | 7/1996 | |
| EP | 0 751 609 A2 | 1/1997 | |
| JP | 9-19119 | 1/1997 | ........... H02K/19/36 |

OTHER PUBLICATIONS

Abstract JP11019119, Jan. 26, 1999.
Patent Abstracts of Japan, vol. 007, No. 166, Jul. 21, 1983 & JP 58 072358 A, Apr. 30, 1983, Abstract.
Patent Abstracts of Japan, vol. 018, No. 617, Nov. 24, 1994 & JP 06 233483, Aug. 19, 1994, Abstract.

* cited by examiner

*Primary Examiner*—Dang Le
(74) *Attorney, Agent, or Firm*—Sughrue Mion, PLLC

(57) ABSTRACT

An AC generator structure allows the assembly of a stator thereof to be easily automatized for rationalization of the manufacturing process, while ensuring suppression of heat generation and providing an enhanced cooling function during operation. The stator includes a core and a winding assembly having stator windings. A rotor is enclosed by the core. A rectifier device rectifies an AC power taken out from the winding assembly. In the stator, outgoing conductors form output conductor end portions and connecting conductor end portions, which are substantially parallel to the core's center axis. The connecting conductor end portions are connected to a connecting member distinct from the rectifier device and disposed offset laterally from the stator's center axis. The stator windings are interconnected in a predetermined connection pattern through the connecting member. The output conductor end portions, through which the AC power is taken out, are connected to the rectifier device.

13 Claims, 12 Drawing Sheets

VEHICLE-ONBOARD AC GENERATOR

BACKGROUND OF THE INVENTION

1. Field of the Invention

The present invention generally relates to an alternating current or AC generator destined for use in an automobile or motor vehicle (hereinafter, this type generator will also be referred to as the vehicle-onboard AC generator). More particularly, the present invention is concerned with an improvement concerning an arrangement for interconnection of stator windings of the vehicle-onboard AC generator.

2. Description of Related Art

Figure 15:
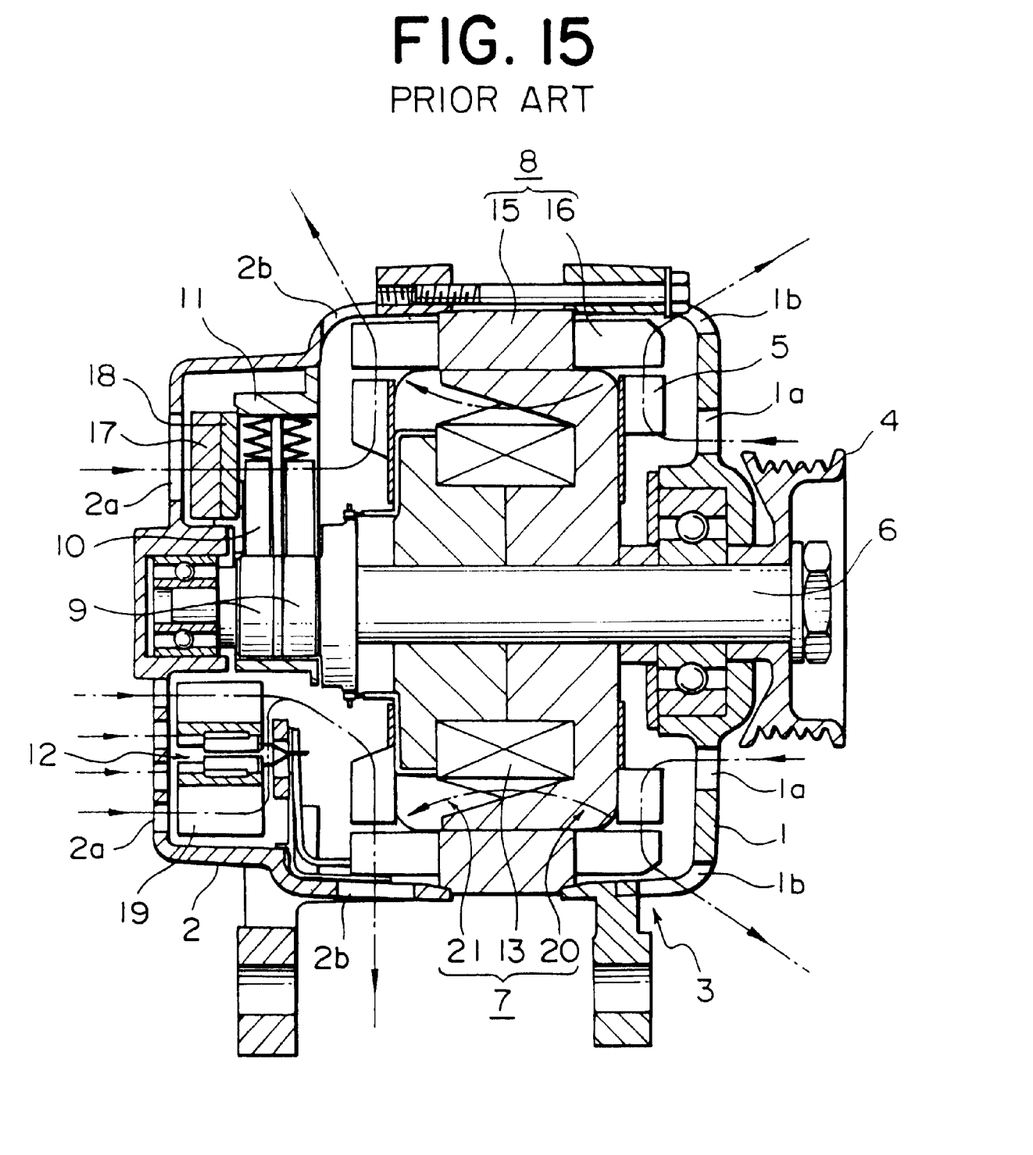
FIG. 15 is a sectional view showing a structure of a conventional AC generator.

Before entering into description of the vehicle-onboard AC generator according to the present invention, technical background thereof will be reviewed in some detail for having better understanding of the concept underlying the invention. FIG. 15 is a sectional view showing a conventional AC generator which has heretofore been known. Referring to the figure, the illustrated AC generator is comprised of a housing or case 3 made of aluminum, which case includes a front bracket 1 and a rear bracket 2. A shaft 6 is rotatably mounted on the brackets 1 and 2 by means of roll bearings within the case 3, and a pulley 4 is mounted at one end thereof. A landaulet type rotor 7 is fixedly mounted on the shaft 6 for corotation therewith. A pair of fans 5 are fixedly secured to both surfaces, respectively, of the rotor 7 for the purpose of cooling. A stator 8 is stationarily mounted on an inner wall of the case 3. A slip ring 9 is fixedly mounted on the shaft 6 at the other end portion thereof for supplying an electric current to the rotor 7. A pair of brushes 10 are disposed in slidable contact with the slip ring 9. A brush holder 11 is so disposed as to accommodate therein and support the brushes 10. A rectifier device 12 is electrically connected to the windings of the stator 8 for rectifying an alternating current induced in the stator windings into a direct current. A heat sink 17 is physically coupled to the brush holder 11. Further, a regulator 18 is fixedly secured onto the heat sink 17 for adjusting or regulating the magnitude of an AC voltage induced in the stator winding assembly.

The armature rotor 7 is composed of a rotor coil 13 through which a direct current supplied from a battery (not shown) is caused to flow for generating magnetic fluxes. A pole core is so disposed as to encase therein the rotor coil 13 and has magnetic poles formed by the magnetic fluxes. More specifically, the pole core is constituted by a first pole core member 20 and a second pole core member 21 which are complementarily meshed together for thereby constituting the pole core.

On the other hand, the stator 8 is constituted by a stator core 15 and stator windings (also referred to generically as the stator winding assembly) 16 each of which is formed by winding an electric conductor on the stator core 15 and in which an alternating current is induced under the effect of changing of the magnetic fluxes emanated from the rotor coil 13. Incidentally, arrows shown in FIG. 15 represent flows of cooling air generated by the fans 5.

In the vehicle-onboard AC generator implemented in the structure described above, a DC current is supplied to the rotor coil 13 from a battery (not shown) by way of the brushes 10 and the slip ring 9, whereby magnetic fluxes are generated by the rotor coil 13. As a result of this, the first pole core member 20 is magnetized in N-polarity while the second pole core member 21 is magnetized in S-polarity. On the other hand, the pulley 4 of the AC generator is driven by an engine such as an internal combustion engine of the motor vehicle on which the AC generator is installed, whereby the shaft 6 and hence the rotor 7 are caused to rotate in unison. Consequently, the stator windings are exposed to the rotating magnetic fields, which results in generation of an alternating current in the stator winding assembly 16 under the effect of electromagnetic induction. The alternating current as generated is supplied to the rectifier device 12 to be thereby rectified into a direct current, the magnitude of which can be adjusted by the regulator 18. The direct current outputted from the rectifier device 12 is ultimately charged in the battery.

Figure 16:
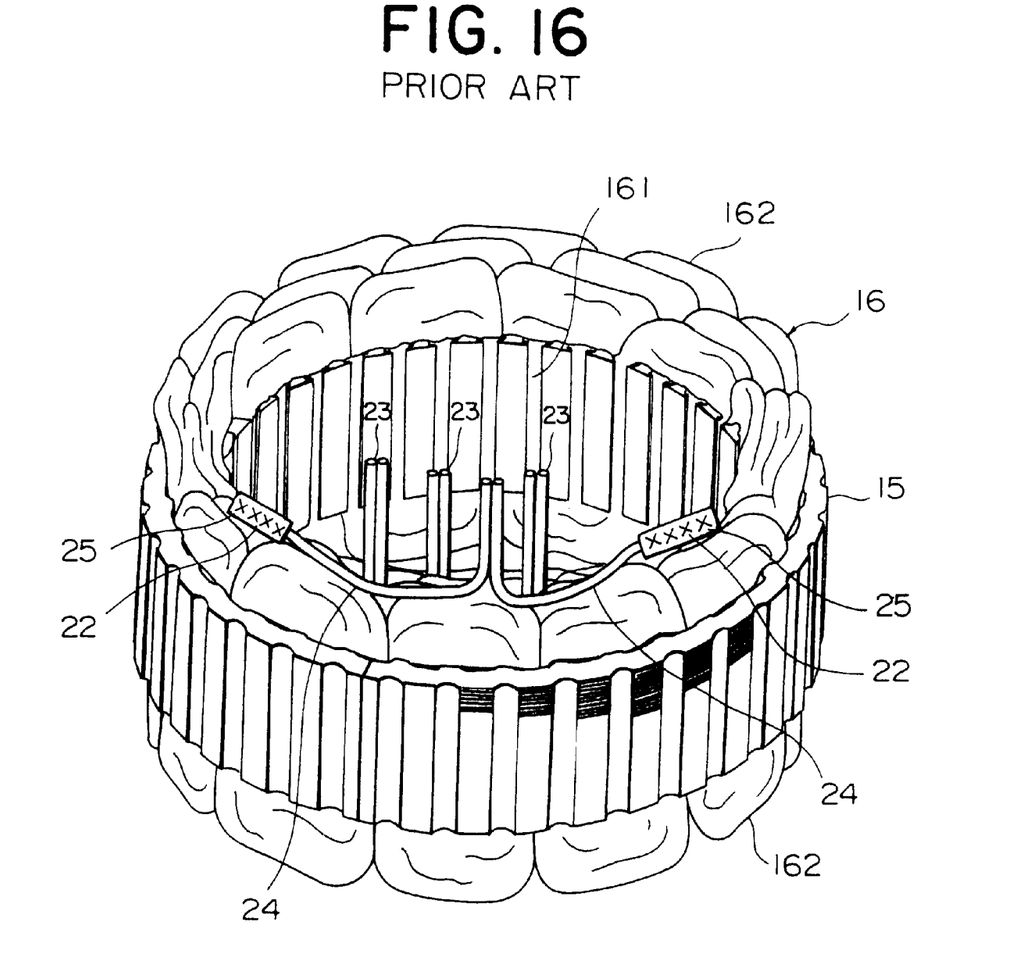
FIG. 16 is a perspective view showing a structure of a stator of the same.
Figure 17:
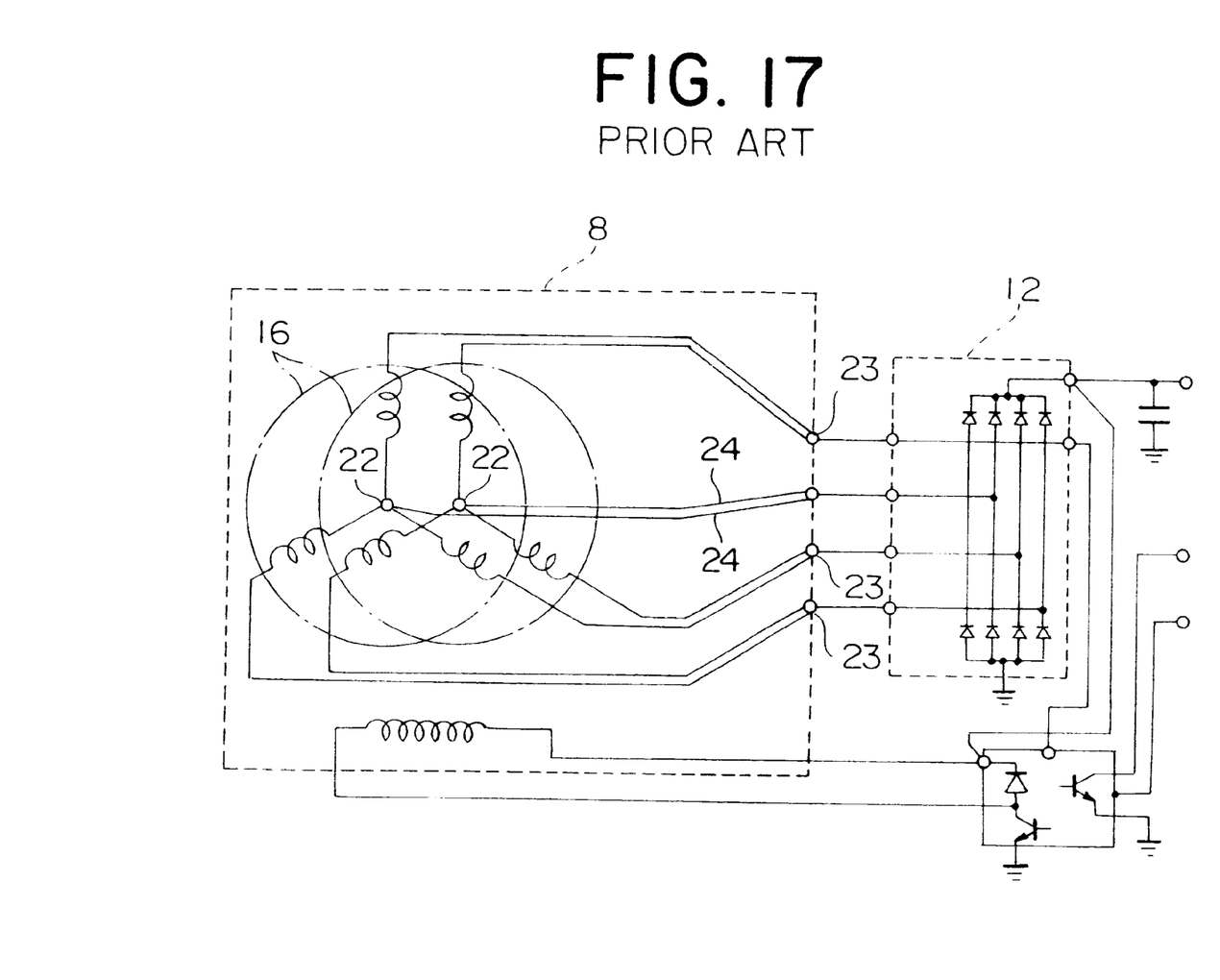
FIG. 17 is an equivalent circuit diagram of the same.

FIG. 16 is a perspective view showing a structure of the stator of the conventional AC generator, and FIG. 17 is an equivalent circuit diagram thereof. Referring to FIG. 16, the stator windings 16 are each formed by winding a round wire conductor and accommodated or housed stationarily within slots formed in the stator core 15. As can be seen in FIG. 16, the stator winding assembly 16 is comprised of lodged portions 161 housed within the slots and coil end portions 162 projecting, respectively, beyond both ends of the stator core 15.

Referring to FIG. 17, the stator windings 16 are interconnected in a star connection in order to realize a three-phase AC generator circuit. End portions of the three conductors led out from the individual windings of the stator winding assembly are connected together to form a neutral point in the form of a neutral point junction 22. Further, interconnecting portions 23 are provided for interconnecting the conductors brought out from the stator windings and terminals of the three-phase rectifier device 12. Further, for the purpose of taking out the output power from the neutral point junction 22, an output power conductor 24 is electrically connected to the neutral point junction 22, although it depends on the design conditions. In that case, the neutral point junction 22 is realized by connecting together the end portions of four electric conductors in total.

In this conjunction, it is further noted that in recent years, there is a tendency that a thick conductor of a large diameter is employed for forming the stator winding assembly in an attempt for implementing the three-phase AC generator having a high output capacity. To this end, a so-called bifilar-winding or W-winding in which a single winding conductor is divided into two coextensive conductors is increasingly adopted. In the case of the stator composed of the bifilar type windings, one neutral point junction 22 is provided at one location on one side, while in the case of the W-winding type, two neutral point junctions 22 have to be provided at two locations on both sides, respectively, as can be seen in FIG. 17. In any case, the output power conductors 24 have to be brought out from the neutral point junction(s) 22.

The output power conductor 24 mentioned above is made of tough pitch copper, and each joint forming the interconnecting portion is realized by soldering. After the soldering, the conductor portions forming the neutral point junction 22 are encased within an insulation tube 25. In succession, the encased conductor portion is laid or bent along the coil end portion to be subsequently fixed by applying a varnish or the like with a view to ensuring a vibration withstanding capability. Of course, the joint described above may be realized by using heterogeneous metal, as disclosed in Japanese Patent Application Laid-Open Publication No. 115743/1995 (JP-A-7-115743).

In the conventional vehicle-onboard AC generator of the structure described above, when interconnection of the conductors brought out from the individual windings has to be made internally of the stator 8, the output power conductor 24 extending from the round wire conductors have to be wired along the circumference defined by the coil end portions 162, involving difficulty in automatization of the wiring by machine.

Further, since the conductor portions forming the neutral point junction 22 are encased within the insulation tube 25 and laid on and along the coil end portions 162 to be subsequently fixed by a varnish, a heat radiation property of these conductor portions is poor when compared with the conductors of other winding portions, incurring high temperature rise. Consequently, thermal deterioration of these conductor portions as well as the adjacent conductor portions is promoted, providing a major factor for degradation of the durability of the stator as a whole.

Besides, the process for securing the connected and tube-inserted conductors onto the coil end portion 162 is difficult to automative, providing a problem in reduction of the cost of processing or treatment.

In the case of the AC generator disclosed in Japanese Patent Application Laid-Open Publication No. 19119/1997 (JP-A-9-19119) a single circuit board is employed for connections/interconnections of all the conductors. In that case, the rigidness of the stator as a whole is increased remarkably, which however means that difficulty will be encountered in correcting positional misalignment between the stator and the rectifier device upon assembling the stator onto the main body of the AC generator. In many cases, the circuit board is forcibly distorted, providing a cause for degradation of the durability. Besides, the work for assembling the AC generator becomes very troublesome. In some case, the circuit board is cracked, to a great disadvantage.

Furthermore, the circuit board disclosed in Japanese Patent Application Laid-Open Publication No. 19119/1997 is equipped integrally with an intermediate connecting member and an output terminal member and thus poor in respect to the cooling performance, exerting adverse influence to the temperature characteristics or behavior of the rectifier device. Besides, upon occurrence of a short-circuit fault, the connecting terminal member implemented in a large length and thus exhibiting high electrical resistance gives rise to another problem that relevant molded portions are burnt under the heat generated due to a large short-circuit current. For these reasons and because of spatial restriction imposed on the circuit board, realization of the vehicle-onboard AC generator with high output capacity encounters unavoidably a limitation.

SUMMARY OF THE INVENTION

In the light of the state of the art described above, it is an object of the present invention to provide a vehicle-onboard AC generator of an improved structure which allows the process for assembling the stator of the AC generator to be easily automatized for rationalization of the AC generator manufacturing process while ensuring positive suppression of heat generation as well as enhanced cooling performance in operation of the AC generator.

In view of the above and other objects which will become apparent as the description proceeds, there is provided according to an aspect of the present invention a vehicle-onboard AC generator which includes a stator comprised of a stator core and a stator winding assembly including a plurality of stator windings, a rotor disposed in a state enclosed by the stator core, and a rectifier device for rectifying an AC power taken out from the stator winding assembly, wherein in the stator, a plurality of outgoing conductors forming output conductor end portions and connecting conductor end portions, respectively, are brought out substantially in parallel with a center axis of the stator core. The connecting conductor end portions are connected to an intermediate connecting member provided independently from the rectifier device and disposed on the stator at a position offset laterally from the center axis thereof. The stator windings are interconnected in a predetermined connection pattern through the medium of the intermediate connecting member. The output conductor end portions through which the AC power is taken out are connected to corresponding terminals of the rectifier device.

By virtue of the stator structure in which the intermediate connecting member is employed for interconnecting the stator windings in a predetermined connection pattern such as the star connection, as described above, the wiring process to be performed internally of the stator which will otherwise be required can be spared, to an advantage. More specifically, the processes for interconnection of the winding end conductors, insertion of the conductors in the insulation tubes, securing of the tube-encased conductor portions to the stator coil end portion and others which are difficult to automatize can be spared. This feature in turn contributes to rationalization of the manufacture of the vehicle-onboard AC generator, to a further advantage. To say in another way, since the wiring process which has heretofore been required can be spared owing to provision of the intermediate connecting member (or wiring terminal member) as the terminals dedicated to the wiring for interconnection of the stator winding end conductors in the circuit board of the rectifier device, the manufacturing cost on the whole can be reduced remarkably because of rationalization of the manufacturing process although the material cost increases to some extent due to increase of the number of parts.

Additionally, because heat generation in the coil end portions of the stator winding assembly can be suppressed with the cooling susceptibility of the AC generator being thereby enhanced, high reliability can be ensured for the operation of the vehicle-onboard AC generator.

Besides, because the intermediate connecting member is neither physically connected to the stator nor implemented integrally with the stator and because the intermediate connecting member is provided independently or separately from the rectifier device, a distortion force which would be applied to the rectifier device upon assembling of the stator in the main body of the AC generator can be mitigated, whereby assembling efficiency can be enhanced while the possibility of the circuit board being unwantedly cracked can positively be excluded.

Furthermore, since the intermediate connecting member is provided independently or separately from the rectifier device, the intermediate connecting member can be so disposed that the metal portion thereof is exposed exteriorly, which contributes to enhancing the cooling susceptibility of the stator and hence that of the AC generator.

In a mode for carrying out the present invention, a neutral point output conductor which is connected to the rectifier device should preferably be formed by the connecting conductor end portions as well.

Owing to the arrangement mentioned above, the structure for taking out the AC output power from the neutral point can easily be implemented, which also contributes to increasing the efficiency of generator manufacturing process.

In another mode for carrying out the present invention, the intermediate connecting member should preferably be implemented as a wiring terminal member which is formed of a same copper series metal as a wiring conductor.

By forming the intermediate connecting member of a same copper series metal as the winding conductor which exhibits a high electric conductivity, heat generation brought about upon rectification can be suppressed, whereby the temperature is prevented from rising excessively.

In yet another preferred mode for carrying out the present invention, the wiring terminal member may be molded.

By covering or coating the wiring terminal member with a resin or the like material, the surface of the wiring terminal member which faces oppositely to the cooling fan can be made smooth, whereby generation of disturbing noise can be suppressed significantly. Besides, corrosion resistance of the wiring terminal member can be increased.

In still another mode for carrying out the present invention, the wiring terminal member should preferably be secured fittingly in a circuit board on which at least said rectifier device is implemented.

Owing to the arrangement described above, possibility of the wiring terminal member being inadvertently removed in the course of assembling the AC generator can positively be excluded. Thus, the manufacturing efficiency can be enhanced. Further, the existing manufacturing equipment can be used without modification. Besides, since the wiring terminal member is secured fittingly as described above, it is possible to suppress generation of noise due to resonance which may take place between the circuit board and the wiring terminal member during operation of the AC generator. Thus, an enhanced vibration withstanding capability can be ensured for the AC generator.

In a further preferred mode for carrying out the present invention, the wiring terminal member should be welded to an insert terminal member in advance to be subsequently molded.

The structure mentioned above can profitably be applied to the AC generator of a relatively low capacity. Since the wiring terminal member is made integrally with the insert terminal member in advance by resistance welding or fusion welding, the process or step for mounting or inserting the wiring terminal member formed as a discrete member can be spared, whereby the generator assembling efficiency can be enhanced significantly.

In a yet further preferred mode for carrying out the present invention, the wiring terminal member may be made of a metal plate undergone a surface treatment.

Owing to the feature mentioned above, the wiring terminal member is imparted with a high corrosion withstanding capability. Thus, high reliability of operation can be ensured for the AC generator over an extended use life thereof.

In a still further preferred mode for carrying out the present invention, the wiring terminal member may be made of a bare copper wire.

By employing the wiring terminal member constituted by the bare copper wire, the wiring or interconnecting structure can be realized inexpensively with the yield of manufacture being increased.

In another preferred mode for carrying out the present invention, the wiring terminal member may be implemented in a structure having an L-shaped cross-section.

By forming the wiring terminal member in the L-like shape in cross-section, the mechanical strength thereof is increased, whereby the reliability of the AC generator can be enhanced correspondingly.

In yet another preferred mode for carrying out the present invention, the connecting conductor end portions may be provided with round terminals, respectively, wherein connection of the connecting conductor end portions with the intermediate connecting member is realized by means of screws.

With the arrangement described above, works involved in the connection are simplified and facilitated, which can enhance the efficiency of assembling the AC generator. Besides, the electrical and mechanical connection of high reliability can be realized.

In still another preferred mode for carrying out the present invention, the output conductor end portions may also be provided with round terminals, respectively, wherein connection of the output conductor end portions to the rectifier device is realized by means of screws.

With the arrangement described above, works involved in the connection are simplified and facilitated, which can enhance the efficiency of assembling the AC generator. Besides, the electrical and mechanical connections of high reliability can be realized.

In a further mode for carrying out the present invention, each connecting portion of the intermediate connecting member for connection with the connecting conductor end portions should preferably be implemented in the form of a U-like segment, and the connecting conductor end portion may be fixedly secured to the U-like segment through press fitting.

With the arrangement described above, work for connecting the connecting conductor end portions to the intermediate connecting member is facilitated, whereby efficiency of assembling the generator is enhanced while ensuring high reliability for the connection.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding parts throughout the several views.

Embodiment 1

Figure 1:
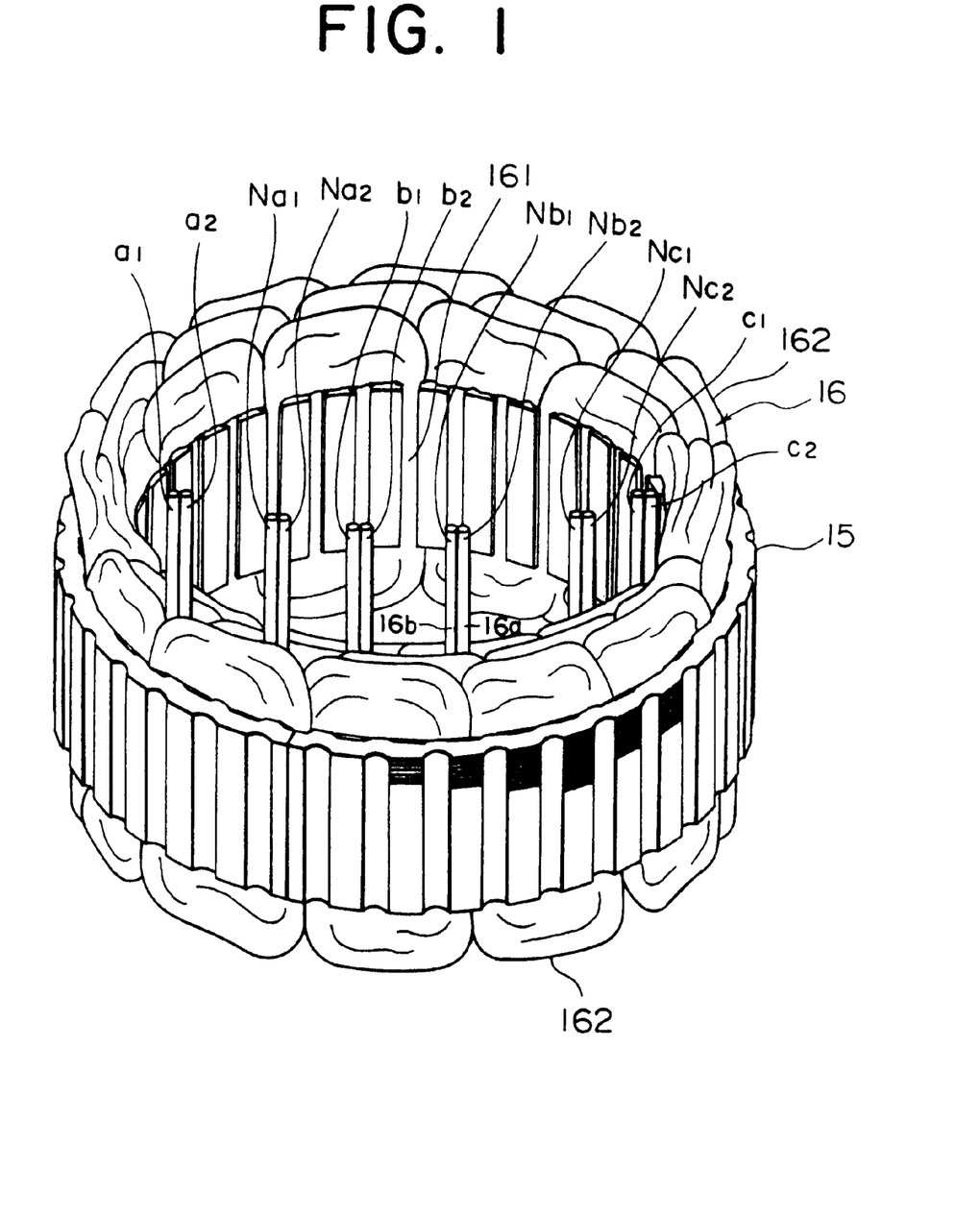
FIG. 1 is a perspective view showing schematically a structure of a stator of a vehicle-onboard AC generator according to a first embodiment of the present invention.
Figure 2:
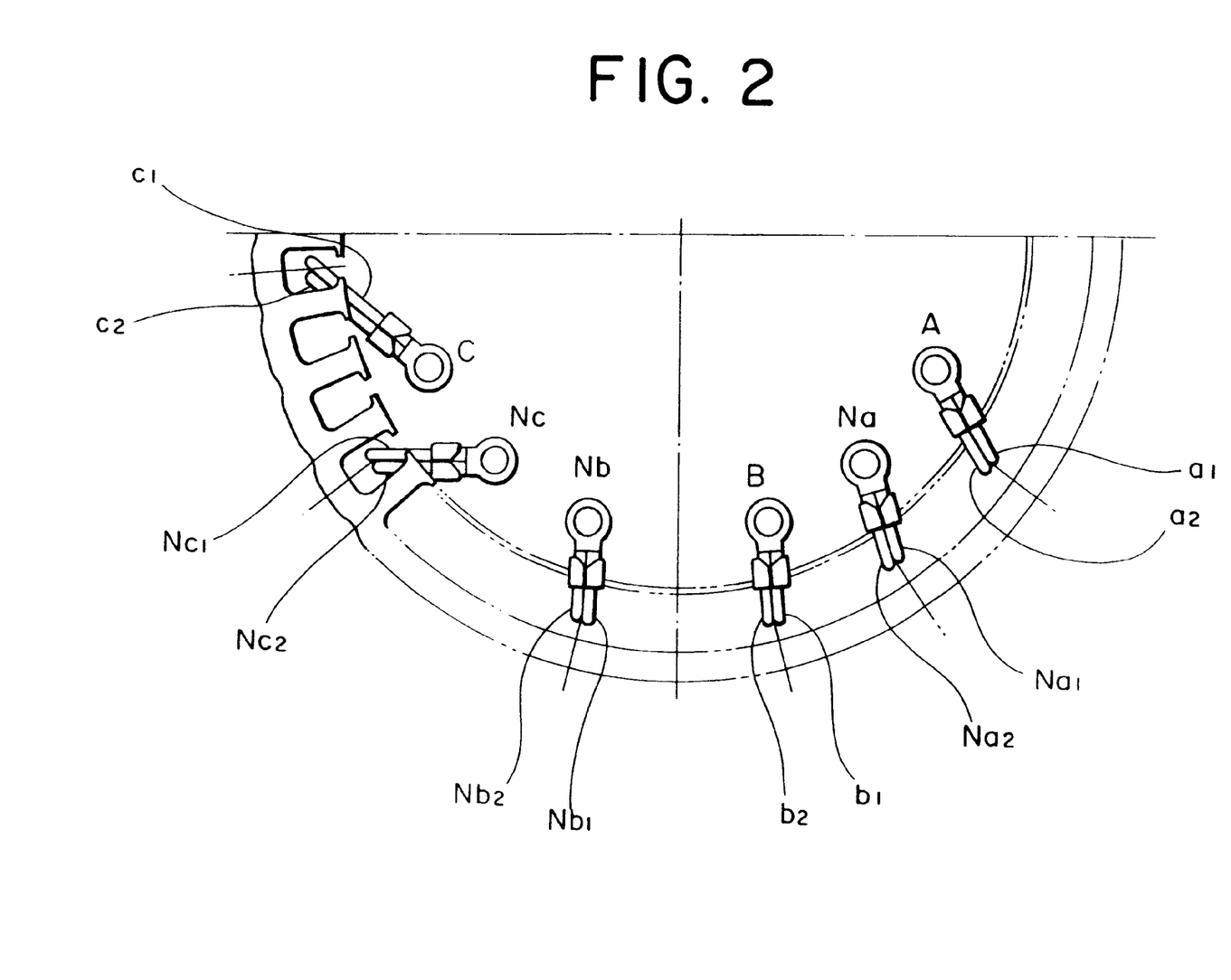
FIG. 2 is a partial end view of the stator.

FIG. 1 is a perspective view showing schematically a structure of the stator of the vehicle-onboard AC generator according to a first embodiment of the present invention. Further, FIG. 2 is a partial end view of a stator of the same. In the vehicle-onboard AC generator now under consideration, the windings or coils of a stator winding assembly 16 are each constituted by a winding round wire conductor. More specifically, the stator winding assembly 16 is constituted by two sets of coils or windings 16a and 16b each formed by winding a bundle of two conductors in and along each of discrete slots of a stator core 15 (i.e., so-called bifilar winding). The stator winding assembly 16 formed in this way has coil end portions 162 projecting beyond both sides, respectively, of the stator core 15 and lodged portions 161 accommodated within the stator core 15.

Brought out from winding or coil end portions 162 of the stator winding assembly at one side thereof substantially in parallel with the center axis of the stator core 15 are output conductor end portions a1, a2, b1, b2, c1 and c2 and connecting conductor end portions Na1, Na2, Nb1, Nb2, Nc1 and Nc2 as outgoing conductors, respectively.

At the tip ends of the individual conductor portions mentioned above, pairs of bifilar conductors a1 and a2, b1 and b2, c1 and c2, Na1 and Na2, Nb1 and Nb2 and Nc1 and Nc2 are mutually joined together, and round terminals A, B and C and Na, Nb and Nc are press-fit onto the joined conductor tip end portions, respectively. The round terminals (terminals having respective circular through-holes) A, B and C as well as Na, Nb and Nc are disposed circumferentially with a predetermined angular distance therebetween so that they can easily be connected to a wiring terminal member 30 and a rectifier device 12, as will be described later on.

Figure 3:
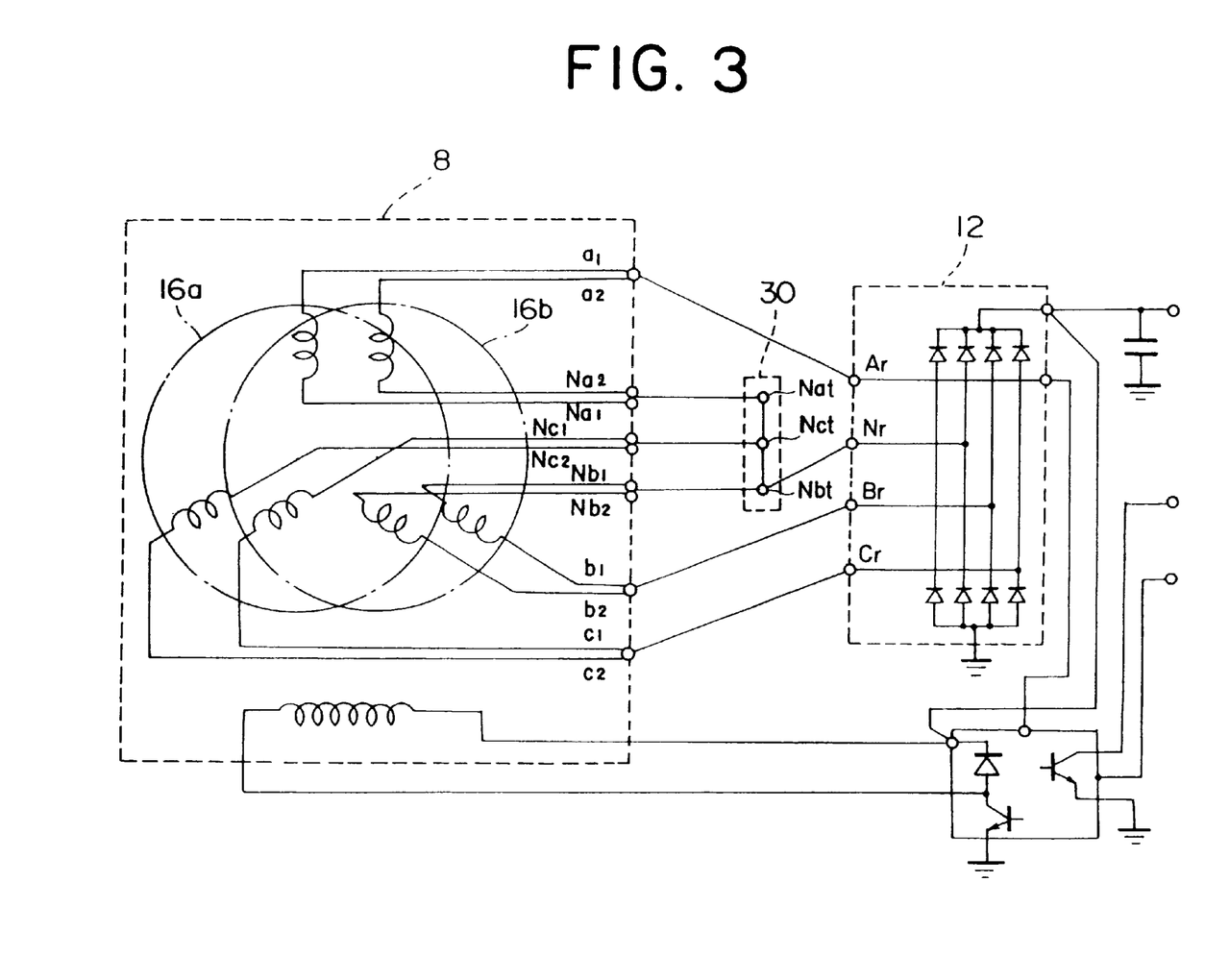
FIG. 3 is an equivalent circuit diagram of the stator according to the first embodiment of the present invention.

FIG. 3 is an equivalent circuit diagram of the stator 8 according to the instant embodiment of the present invention. As can be seen in this figure, the AC power is taken out from the stator winding assembly 16 via the paired output conductor end portions a1; a2, b1; b2 and c1; c2 which are electrically connected to terminals Ar, B and C of the rectifier device 12, respectively.

On the other hand, the paired connecting conductor end portions Na1; Na2, Nb1; Nb2 and Nc1; Nc2 serve for bringing out the ends of the stator winding or coil conductors for the purpose of forming the neutral point of star connection. To this end, the paired connecting conductor end portions Na1; Na2, Nb1; Nb2 and Nc1; Nc2 brought out externally are connected to terminals Nat, Nbt and Nct, respectively, of a wiring terminal member 30 which serves as an intermediate connecting member, so that the phase windings or coils of the stator winding assembly 16 are interconnected in the form of the star connection. The wiring terminal member 30 has a terminal Nbt which serves as the neutral point of the interconnected stator windings. This terminal Nbt is electrically connected to a terminal Nr of the rectifier device 12.

Figure 4:
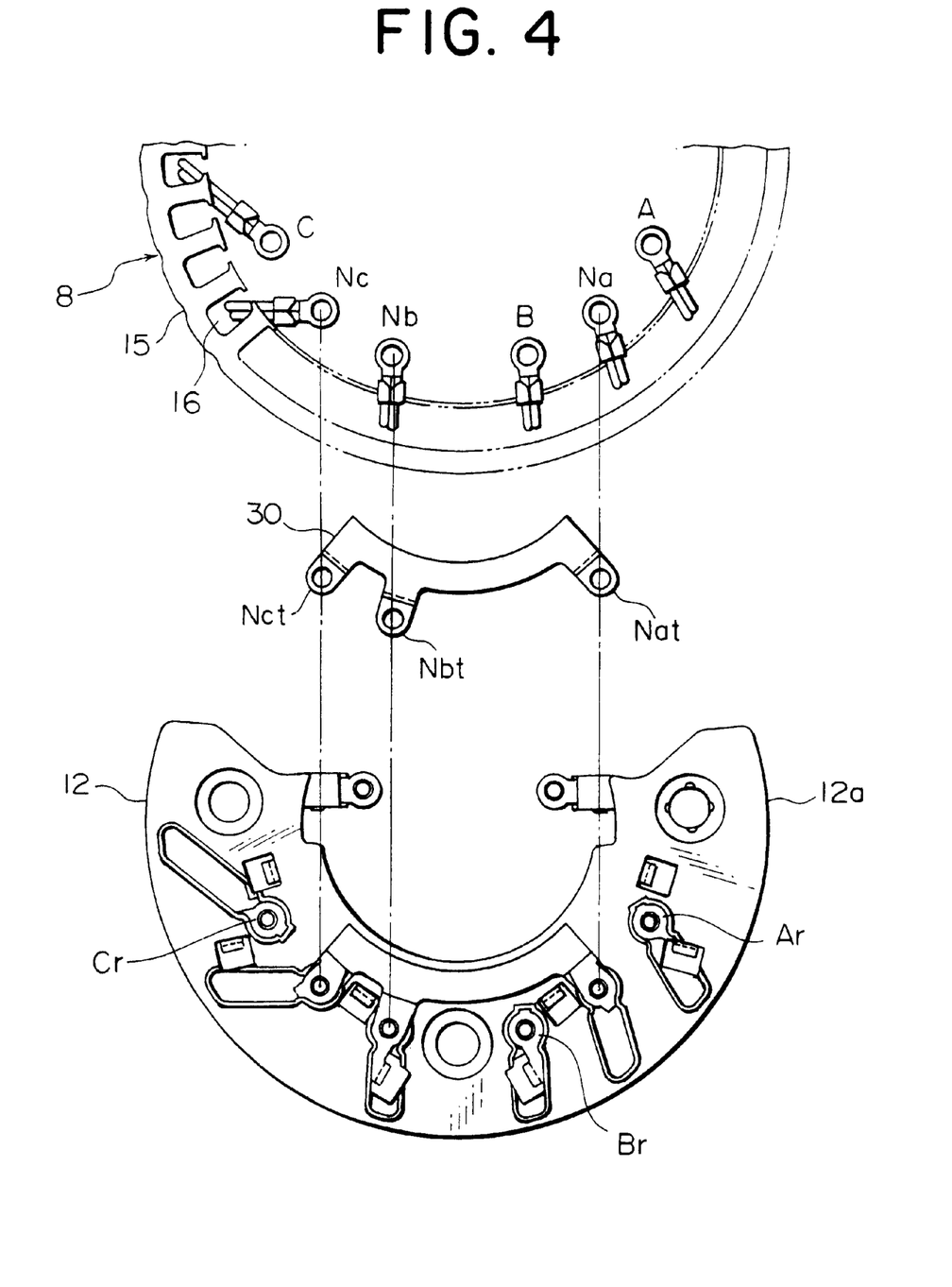
FIG. 4 is a development view showing a positional relationship among the stator, a wiring terminal member serving as an intermediate connecting member and a rectifier device according to the first embodiment of the present invention.

FIG. 4 is a development view showing a positional relationship among the stator 8, the wiring terminal member 30 and the rectifier device 12 which are to be interconnected in the AC generator according to the instant embodiment of the present invention. The round terminals A, B and C and Na, Nb and Nc provided on the stator winding assembly 16 are disposed circumferentially with a predetermined angular distance therebetween, as mentioned previously. The intermediate terminal member 30 serving for wiring is provided with the terminals Nat, Nbt and Nct at such positions that they are positionally aligned with the aforementioned round terminals Na, Nb and Nc, respectively, of the stator winding assembly. The round terminals Na, Nb and Nc of the stator winding assembly and the terminals Nat, Nbt and Nct of the intermediate terminal member 30 are electrically and mechanically connected or joined together by using screws upon manufacturing of the stator assembly. On the other hand, the terminals Ar, Br and Cr provided on the circuit board of the rectifier device 12 are so disposed that they are positionally aligned with the round terminals A, B and C of the stator windings, respectively. Thus, the round terminals A, B and C of the stator winding assembly can electrically and mechanically be coupled with the terminals Ar, Br and Cr, respectively, of the rectifier device 12 by means of screws without any appreciable difficulty in the course of manufacturing the AC generator. The terminal Nbt of the wiring terminal member 30 also serves as the terminal for connecting the neutral point of the stator winding assembly to the rectifier device 12 and is adapted to be electrically and mechanically connected to the terminal Nr of the rectifier device 12 by using a screw.

Figure 5A:
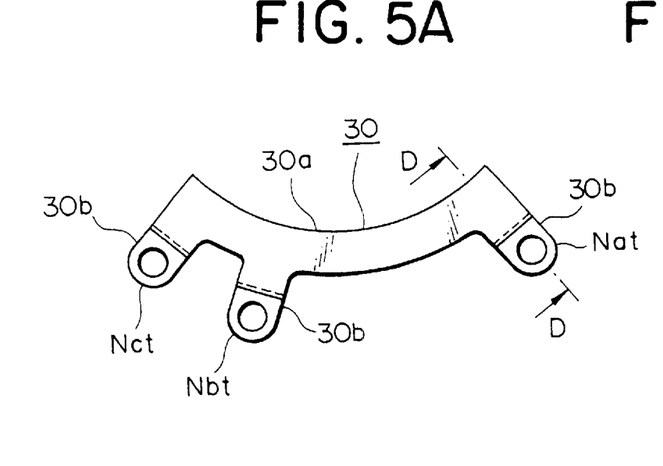
FIG. 5A is a top plan view showing in detail a structure of the wiring terminal member.
Figure 5B:
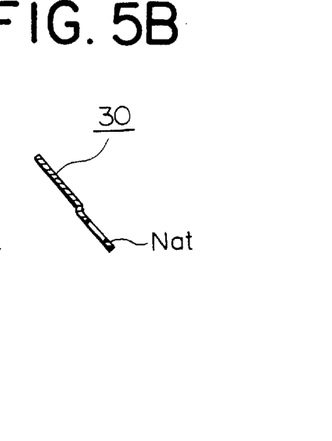
FIG. 5B is a sectional view of the same taken along a line D—D in FIG. 5A and viewed in the direction indicated by arrows.

FIG. 5A is a top plan view showing in detail a structure of the wiring terminal member 30 serving as the intermediate connecting member and FIG. 5B is a sectional view of the same taken along a line D—D in FIG. 5A and viewed in the direction indicated by arrows. The wiring terminal member 30 is fabricated by punching or blanking a metal plate formed, for example, of a same copper series metal as the winding conductor and undergone a surface treatment and includes an arcuate portion 30a bent substantially arcuately so as to extend along the array of the round terminals Na, Nb and Nc and plural (e.g. three) terminal portions 30b projecting substantially radially from the arcuate portion 30a. At this juncture, it should be mentioned that the wiring terminal member 30 is designed to be accommodated within a recess formed in the circuit board 12a of the rectifier device 12, as will be described hereinafter, wherein a major surface of the connecting terminal member 30 is exposed externally. Thus, the excellent heat dissipation property of the connecting terminal member 30 can be ensured.

Figure 6:
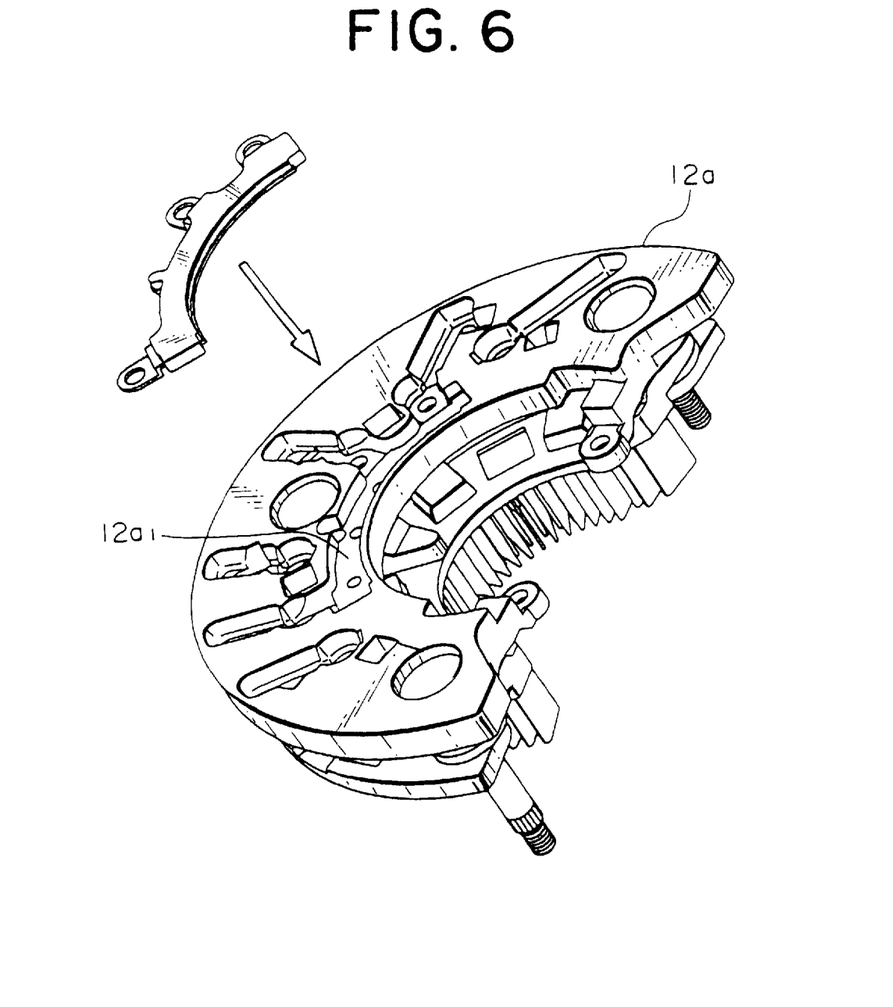
FIG. 6 is a perspective view showing a circuit board disposed on a rear surface of the rectifier device and the wiring terminal member.

FIG. 6 is a perspective view showing the circuit board 12a disposed on a rear surface of the rectifier device 12 and the wiring terminal member 30. As can be seen in FIG. 6, a receiving recess 12a1 is formed in the circuit board 12a for receiving and accommodating therein the wiring terminal member 30. More specifically, the receiving recess 12a1 is formed in a substantially same shape as the wiring terminal member 30 and has a bottom on which an insert terminal is disposed, as will be described later on.

Incidentally, the arcuate portion 30a of the wiring terminal member 30 is formed of a resin by molding, as will be described later on by reference to FIG. 13.

Figure 7:
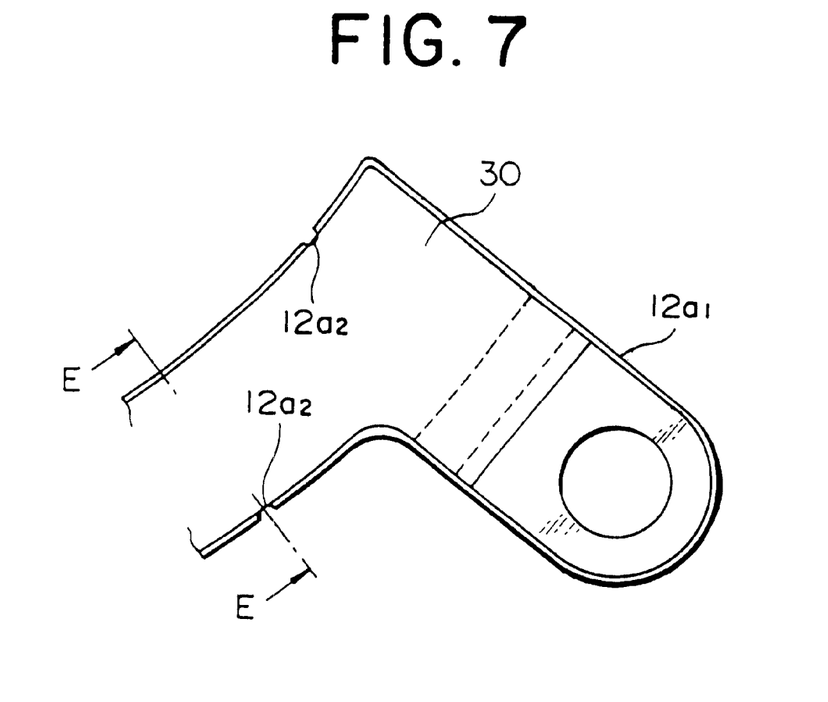
FIG. 7 is a fragmentary top plan view for illustrating an arrangement for securing fixedly the wiring terminal member onto the circuit board.
Figure 8:
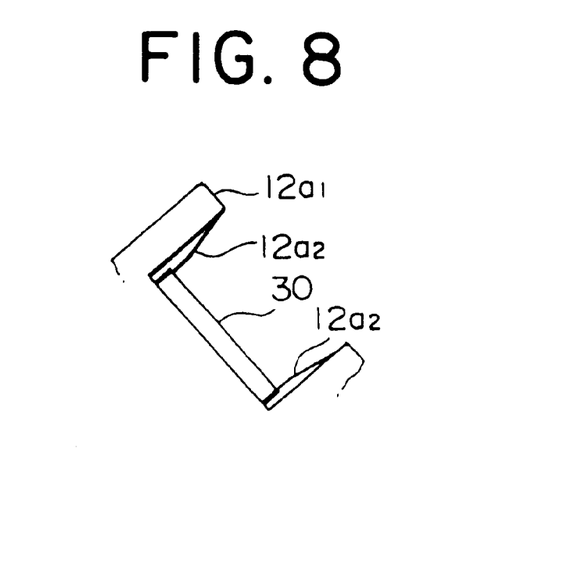
FIG. 8 is a sectional view taken along a line E—E in FIG. 7 and viewed in the direction indicated by arrows.

FIG. 7 is a fragmentary top plan view for illustrating a manner in which the wiring terminal member 30 is fixedly secured within the receiving recess 12a1 formed in the circuit board 12a of the rectifier device 12, and FIG. 8 is a sectional view taken along a line E—E in FIG. 7 and viewed in the direction indicated by arrows. The wiring terminal member 30 is accommodated or received within the receiving recess 12a1 and secured fittingly therein with the side edge of the connecting terminal member 30 being frictionally retained by a plurality of protrusions 12a2 formed in the side wall of the receiving recess 12a1. Needless to say, once accommodated within the receiving recess 12a1, the wiring terminal member 30 is positively prevented from being released therefrom owing to the frictional engagement with the protrusions 12a2.

Figure 9:
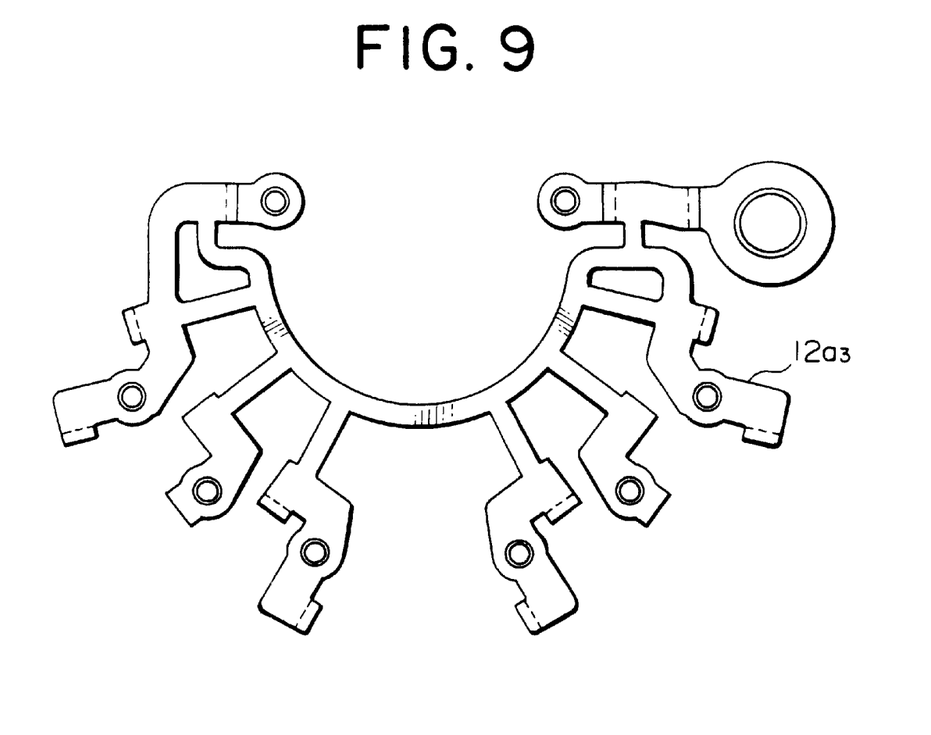
FIG. 9 is a top plan view showing an insert terminal member adapted to be secured onto the circuit board of the rectifier device by molding.

FIG. 9 is a top plan view showing an insert terminal member 12a3 integrally secured onto the circuit board 12a of the rectifier device 12 by molding. The insert terminal member 12a3 is fabricated by punching a steel plate formed, for example, of a same copper series metal as the winding conductor and has through-holes formed at positions which come to alignment with the positions of the round terminals A, B, C, Na, Nb and Nc, respectively.

In the stator assembly 8 of the vehicle-onboard AC generator implemented in the structure described above, a plurality of outgoing conductors constituting the output conductor end portions a1; a2, b1; b2 and c1; c2 as well as the connecting conductor end portions Na1; Na2, Nb1; Nb2 and Nc1; Nc2, respectively, are brought out substantially in parallel with the center axis of the stator core 15, wherein the connecting conductor end portions Na1; Na2, Nb1; Nb2 and Nc1; Nc2 are connected to the wiring terminal member 30 provided separately from the rectifier device 12 and disposed on the stator 8 at a position offset laterally from the center axis thereof and so wired that the stator windings or coils 16 are interconnected in a predetermined connection pattern such as star connection, while the output conductor end portions a1; a2, b1; b2 and c1; c2 through which the AC power is taken out are electrically connected to the input terminals Ar, Br and Cr, respectively, of the rectifier device 12. By virtue of this arrangement, the wiring process internally of the stator 8 which will otherwise be required can be spared, to an advantage. More specifically, the processes for interconnection of the winding conductors, insertion of the conductors in the insulation tubes, securing of the tube-encased conductor portions to the coil end portion 162 and others which are difficult to automatize can be spared. This feature in turn contributes to rationalization of the manufacture of the vehicle-onboard AC generator, to a further advantage. To say in another way, since the wiring process which has heretofore been required can be spared owing to additional provision of the wiring terminal member 30 as the terminals dedicated to the wiring in the circuit board 12a of the rectifier device 12, the manufacturing cost on the whole can be reduced remarkably because of the rationalized manufacturing process described above although the material cost increases to some extent due to increase of the number of parts.

Additionally, heat generation in the coil end portion 162 of the stator winding assembly can be suppressed, as a result of which the cooling performance of the AC generator can be enhanced, which can ensure high reliability in operation of the vehicle-onboard AC generator.

Further, the connecting conductor end portions Na1; Na2, Nb1; Nb2 and Nc1; Nc2 which also serve as the neutral point power output conductors are connected to the rectifier device 12. Thus, the structure for taking out the output power from the neutral point can be simplified, which contributes to enhancing the manufacturing efficiency of the vehicle-onboard AC generator.

Furthermore, the intermediate connecting member is implemented as the wiring terminal member 30 which is formed of a same copper series metal as the winding conductor. Thus, heat generation brought about upon rectification is suppressed and the temperature is prevented from rising excessively.

Furthermore, the wiring terminal member 30 can be secured fittingly onto the circuit board 12a in precedence to the assembling process. As a result of this, there arises no possibility of the wiring terminal member 30 being inadvertently removed in the course of assembling the AC generator. Thus, the manufacturing efficiency can be enhanced. Further, the existing manufacturing equipment can be used without modification. Besides, since the wiring terminal member 30 is secured fittingly as described previously, it is possible to suppress generation of noise due to resonance between the circuit board 12a and the wiring terminal member 30 in the operation of the generator. Thus, an enhanced vibration withstanding capability can be ensured for the AC generator.

Furthermore, the wiring terminal member 30 is fabricated of a metal plate undergone a surface treatment, as described hereinbefore. Owing to this feature, the wiring terminal member 30 is imparted with high corrosion withstanding capability. Thus, high reliability can be ensured for the AC generator over an extended use life.

It should further be mentioned that the connecting conductor end portions Na1; Na2, Nb1; Nb2 and Nc1; Nc2 as well as the output conductor end portions a1; a2, b1; b2 and c1; c2 are each provided with the round terminal, wherein the mechanical and electrical connections between the connecting conductor end portions Na1; Na2, Nb1; Nb2 and Nc1; Nc2 and the wiring terminal member 30 as well as the mechanical and electrical connections between the output conductor end portions a1; a2, b1; b2 and c1; c2 and the rectifier device 12 are realized by using the screws, as described hereinbefore. Consequently, works involved in these connections are simplified and facilitated, as a result of which efficiency of assembling the AC generator can be improved. Besides, the mechanical and electrical connections can be realized with high reliability.

At this juncture, it should also be mentioned that although the wiring terminal member 30 of the AC generator according to the first embodiment of the present invention is made of a metal plate, the present invention is never restricted thereto. Bare copper wires may be used to this end. By employing the wiring terminal member 30 constituted by the bare copper wires, the wiring or interconnecting structure can be realized inexpensively with the yield of manufacture being correspondingly increased.

Embodiment 2

Figures 10A, 10B:
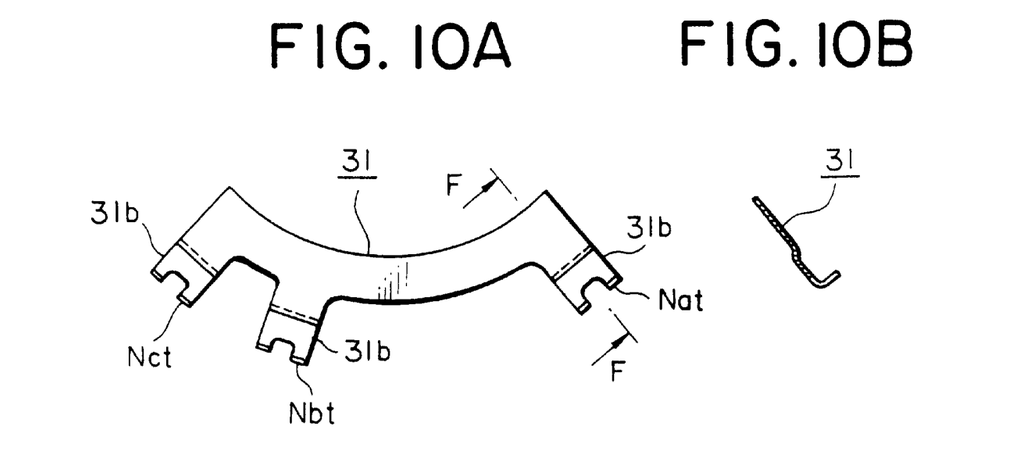
FIG. 10A is a top plan view showing in detail a structure of the intermediate connecting member according to a second embodiment of the present invention.
FIG. 10B is a sectional view of the same taken along a line F—F in FIG. 10A and viewed in the direction indicated by arrows.
Figure 11:
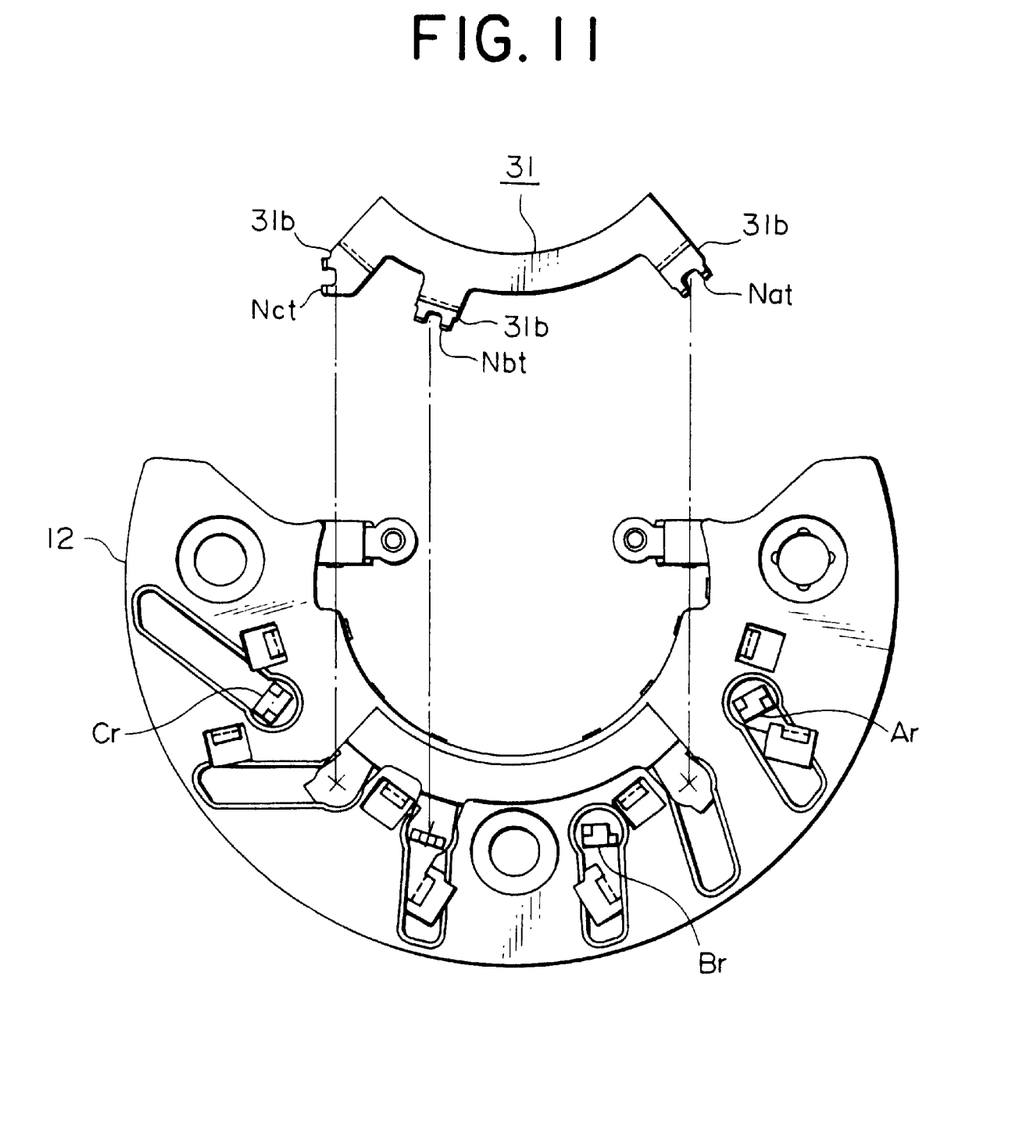
FIG. 11 is a view showing a positional relationship between the intermediate connecting member according to the second embodiment and the rectifier device to be connected to each other.

Now, description will turn to a second embodiment of the present invention. FIGS. 10A and 10B are views showing in detail a structure of the intermediate connecting member of the vehicle-onboard AC generator according to a second embodiment of the present invention, in which FIG. 10A is a top plan view of the same and FIG. 10B is a sectional view taken along a line F—F in FIG. 10A and viewed in the direction indicated by arrows. Further, FIG. 11 is a view showing a positional relationship for connection between the intermediate connecting member and the circuit board of the rectifier device. According to the teaching of the invention incarnated in the instant embodiment, the wiring terminal member 31 serving as the intermediate connecting member includes terminal portions 31b each having a stamped tip end formed in a U-like shape having legs bent substantially at a right angle, as can be seen in FIG. 10B.

More specifically, in the vehicle-onboard AC generator according to the instant embodiment of the present invention, each connecting portion of the wiring terminal member 31 employed as the intermediate connecting member for connection with the connecting conductor end portions Na1; Na2, Nb1; Nb2 and Nc1; Nc2 is implemented in the former of U-like segment so that the connecting conductor end portion Na1; Na2, Nb1; Nb2 and Nc1; Nc2 can be fixedly secured to the U-like segment through press fitting. For this reason, each of the connecting conductor end portion Na1; Na2, Nb1; Nb2 and Nc1; Nc2 is provided with no round terminal in the AC generator according to the instant embodiment of the invention. With the structure of the wiring terminal member described above, the process for connecting the connecting conductor end portions Na1; Na2, Nb1; Nb2 and Nc1; Nc2 to the wiring terminal member 31 can be much facilitated, whereby efficiency of assembling the vehicle-onboard AC generator can be enhanced while ensuring high reliability for the connection.

In this conjunction, it should also be mentioned that the U-shape portion is formed not only in each of the terminals portion or piece 31b of the wiring terminal member 31 but also in each of the corresponding terminals of the rectifier device 12 through stamping in the case of the AC generator according to the instant embodiment of the invention.

Embodiment 3

Figure 12A:
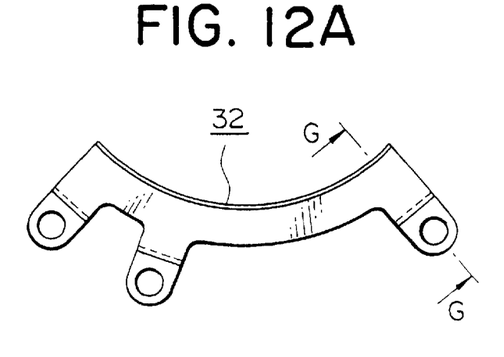
FIG. 12A is a top plan view showing in detail a structure of the intermediate connecting member according to a third embodiment of the present invention.
Figure 12B:
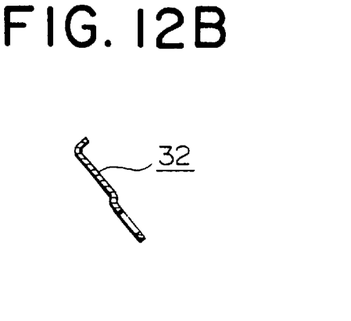
FIG. 12B is a sectional view of the same taken along a line G—G in FIG. 12A and viewed in the direction indicated by arrows.

Next, a third embodiment of the present invention will be described by referring to FIGS. 12A and 12B, in which FIG. 12A is a top plan view showing in detail a structure of the intermediate connecting member of the vehicle-onboard AC generator according to the third embodiment of the invention and FIG. 12B is a sectional view of the same taken along a line G—G in FIG. 12A and viewed in the direction indicated by arrows.

In the case of the AC generator according to the instant embodiment of the invention, the wiring terminal member 32 serving as the intermediate connecting member has one side edge portion which is bent substantially at a right angle relative to the major plane so that the wiring terminal member 32 exhibits approximately an L-shaped section, as can be seen in FIG. 12B. By forming one side edge portion of the wiring terminal member 32 in the L-like shape in cross-section, the mechanical strength of the wiring terminal member is increased, which contributes to increasing the reliability of the AC generator.

Embodiment 4

Figure 13A:
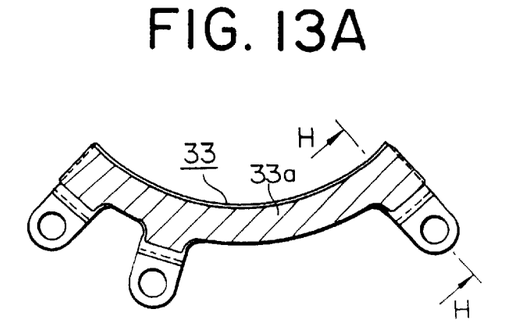
FIG. 13A is a top plan view showing in detail a structure of the intermediate connecting member according to a fourth embodiment of the present invention.
Figure 13B:
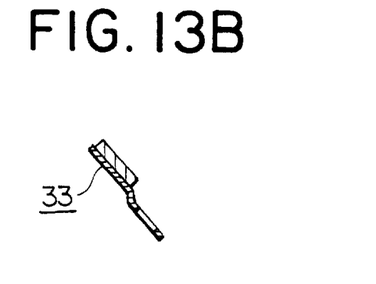
FIG. 13B is a sectional view of the same taken along a line H—H in FIG. 13A and viewed in the direction indicated by arrows.

A fourth embodiment of the present invention will be described by reference to FIGS. 13A and 13B, in which FIG. 13A is a top plan view showing in detail a structure of the intermediate connecting member of the vehicle-onboard AC generator according to the fourth embodiment of the invention and FIG. 13B is a sectional view of the same taken along a line H—H in FIG. 13A and viewed in the direction indicated by arrows. According to the teaching of the invention incarnated in the instant embodiment, the wiring terminal member 33 serving as the intermediate connecting member includes an arcuate portion 33a whose surface facing in opposition to the cooling fan is coated with a molded resin. By covering or coating the wiring terminal member 33 with the molded resin in this manner, the surface facing oppositely to the cooling fan can be smoothed, whereby generation of disturbing noise can be suppressed remarkably. Besides, corrosion resistance of the wiring terminal member can be increased.

Embodiment 5

Figure 14:
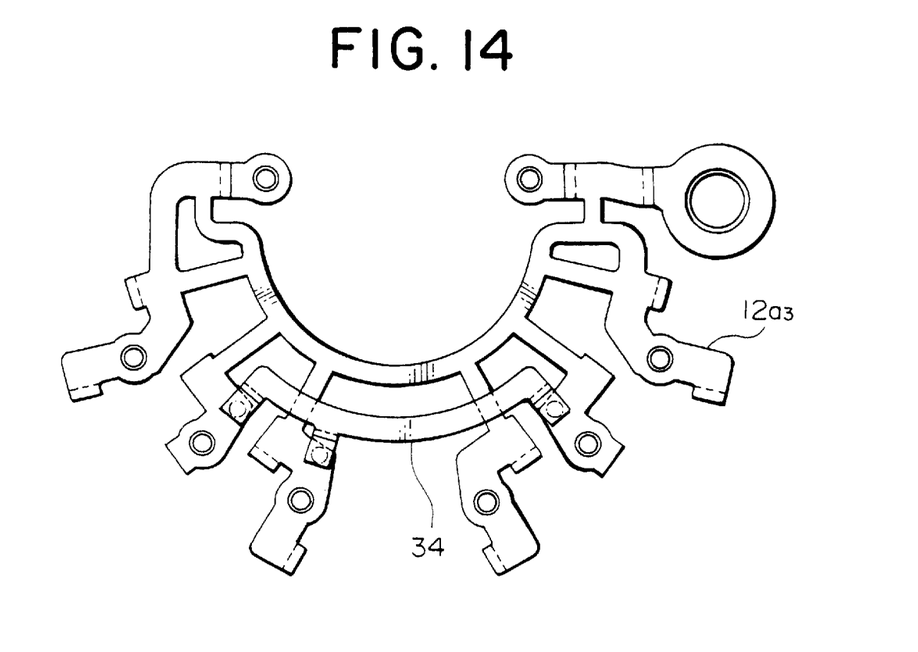
FIG. 14 is a top plan view showing an insert terminal member molded integrally on a circuit board mounted on the stator according to a fifth embodiment of the present invention.

A fifth embodiment of the present invention will be described by reference to FIG. 14, which shows in a top plan view an insert terminal member molded integrally in the circuit board of the rectifier device mounted on the vehicle-onboard AC generator. According to the teaching of the present invention incarnated in the instant embodiment, the wiring terminal member 34 serving as the intermediate connecting member is welded to an insert terminal member 12a3 and subsequently the insert terminal member including the wiring terminal member fixedly mounted thereon is secured onto the rectifier circuit board 12a by molding. The wiring terminal member structure according to the instant embodiment of the present invention can profitably be applied to the AC generator of a relatively low capacity. Since the wiring terminal member 34 is realized integrally as a part of the insert terminal member 12a3 by resistance welding or fusion welding in advance, the process or step for mounting or inserting the wiring terminal member 34 formed as a discrete member can be spared, whereby the generator assembling efficiency can be improved significantly.

Many features and advantages of the present invention are apparent from the detailed description and thus it is intended by the appended claims to cover all such features and advantages of the structures and arrangements which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A vehicle-onboard AC generator, comprising:
   a stator comprised of a stator core and a stator winding assembly including a plurality of stator windings;
   a rotor disposed in by said stator core;
   a rectifier device for rectifying an AC power from said stator winding assembly; and
   a discrete intermediate connecting member distinct from said rectifier device and a circuit board of said AC generator,
   wherein said intermediate connecting member is disposed on said stator at a position offset laterally from the center axis of the stator.
   wherein in said stator, a plurality of outgoing conductors forming output conductor end portions and connecting conductor end portions, respectively, are brought out substantially in parallel with a center axis of said stator core,
   wherein said connecting conductor end portions are connected to said intermediate connecting member, said stator windings being interconnected in a predetermined connection pattern through said intermediate connecting member, and wherein said output conductor end portions for out putting said AC power are connected to said rectifier device.

2. A vehicle-onboard AC generator according to claim 1, wherein said connecting conductor end portions also form a neutral point output conductor which is connected to said rectifier device.

3. A vehicle-onboard AC generator according to claim 1, wherein said intermediate connecting member is implemented as a wiring terminal member which is formed of a same copper series metal as a wiring conductor.

4. A vehicle-onboard AC generator according to claim 3, wherein said wiring terminal member is molded.

5. A vehicle-onboard AC generator according to claim 3, wherein said wiring terminal member is secured fittingly in a circuit board on which at least said rectifier device is implemented.

6. A vehicle-onboard AC generator according to claim 3, wherein said wiring terminal member is welded to an insert terminal member in advance to be subsequently molded.

7. A vehicle-onboard AC generator according to claim 3, wherein said wiring terminal member is made of a metal plate undergone a surface treatment.

8. A vehicle-onboard AC generator according to claim 3, wherein said wiring terminal member is made of a bare copper wire.

9. A vehicle-onboard AC generator according to claim 3, wherein said wiring terminal member is implemented in a structure having an L-shaped cross-section.

10. A vehicle-onboard AC generator according to claim 1, wherein said connecting conductor end portions are provided with round terminals, respectively, and
    wherein connection of said connecting conductor end portions with said intermediate connecting member is realized by means of screws.

11. A vehicle-onboard AC generator according to claim 1, wherein said output conductor end portions are provided with round terminals, respectively, and
    wherein connection of said output conductor end portions to said rectifier device is realized by means of screws.

12. A vehicle-onboard AC generator according to claim 1, wherein each connecting portion of said intermediate connecting member for connection with said connecting conductor end portions is implemented in the form of a U-like segment, and
    wherein said connecting conductor end portion is fixedly secured to said U-like segment through press fitting.

13. A vehicle-onboard AC generator according to claim 1, wherein said intermediate connecting member is disposed in a recess formed in said circuit board.

* * * * *